United States Patent [19]

Kapulka et al.

[11] Patent Number: 6,061,769

[45] Date of Patent: May 9, 2000

[54] DATA SET BACKUP IN A SHARED ENVIRONMENT

[75] Inventors: Kenneth Michael Kapulka, San Jose, Calif.; Ian Hulme Rose; Jonathan Andrew Scott, both of Eastleigh, United Kingdom; Jimmy Paul Strickland, Saratoga, Calif.

[73] Assignee: International Business Machines Corporation, Armonk, N.Y.

[21] Appl. No.: 08/793,006

[22] PCT Filed: Sep. 27, 1995

[86] PCT No.: PCT/GB95/02287

§ 371 Date: Jan. 22, 1997

§ 102(e) Date: Jan. 22, 1997

[87] PCT Pub. No.: WO96/37836

PCT Pub. Date: Nov. 28, 1996

[51] Int. Cl.[7] .................................................. G06F 12/16
[52] U.S. Cl. .................... 711/162; 707/202; 707/204; 714/6; 714/20; 713/502
[58] Field of Search ..................................... 711/161, 162; 714/6, 20; 707/202, 204; 713/502

[56] References Cited

U.S. PATENT DOCUMENTS

| | | | |
|---|---|---|---|
| 5,140,689 | 8/1992 | Kobayashi | 395/575 |
| 5,163,148 | 11/1992 | Walls | 711/162 |
| 5,263,154 | 11/1993 | Eastridge et al. | 395/575 |
| 5,381,545 | 1/1995 | Baker et al. | 395/575 |
| 5,499,367 | 3/1996 | Bamford et al. | 707/1 |
| 5,675,725 | 10/1997 | Malcolm | 714/6 |
| 5,701,437 | 12/1997 | Kinjo et al. | 711/162 |

FOREIGN PATENT DOCUMENTS

| | | | |
|---|---|---|---|
| 516900 | 6/1991 | European Pat. Off. | G06F 11/14 |
| 566966 | 4/1993 | European Pat. Off. | G06F 11/14 |

OTHER PUBLICATIONS

IBM TDB, vol. 34, No. 1, Jun. 1991, "Solutions to Hot Spot Problems In A Data Sharing Transaction Environment".

*Primary Examiner*—Hiep T Nguyen
*Attorney, Agent, or Firm*—Esther E. Klein; Noreen A. Krall

[57] ABSTRACT

A method of taking a backup copy of a data set, for use with a log, with the data set being open for update by multiple updaters is described. A point on the log is identified (Recovery Time) from which it can be ensured that all data updates identified on the log have been written by an updater from buffers to the data set. This is done by recording a Recovery Time, and then not taking the backup until all the updaters have confirmed that they have written all updates from buffers to the data set. In addition, if tokens are used on the log to avoid having to identify the data set in full, then these are also written to the log before the update is taken.

23 Claims, 3 Drawing Sheets

| Backup Manager 130 (DSS) | Data Set Management Layer 140 (VSAM) | Data Set Updaters 120, 122, 124 (CICS Systems) |
|---|---|---|
| 1. Record the current time (NOW) | | |
| 2. Notify that a backup is about to be taken | | |
| | 3. Notify that a backup is about to be taken | |
| | | 4. Write a set of tie-up records to forward recovery log 150, 152, 154 respectively |
| | | 5. Harden any data in buffers to disk |
| | | 6. Notify that ready for copy to proceed |
| | 7. Wait until all updaters 120, 122, 124 have notified that copy ready to proceed | |
| | 8. Notify copying coordinator 130 that copy may proceed | |
| 9. Control record added to backup copy identifying the Recovery Time | | |
| 10. Data set 110 copied | | |

*FIG. 4*

DATA SET BACKUP IN A SHARED ENVIRONMENT

FIELD OF THE INVENTION

The present invention relates to distributed data processing and more specifically to the taking of backup copies of data sets that are open for update by multiple updaters.

BACKGROUND OF THE INVENTION

In data processing systems, the failures that can occur include communication failures (in online systems), data set or database failures, application or system program failures, processor failures and power supply failures. All these problems are potentially more severe in an online system than in a system that performs only batch processing.

In batch systems, input data is usually prepared before processing begins, and jobs can be rerun, either from the start of the job or from some intermediate checkpoint. In online systems, input is usually created dynamically by terminal operators, and arrives in an unpredictable sequence from many different sources. If a failure occurs, it is generally not possible simply to rerun the application because the content and sequence of the input data is unknown. And, even if it is known, it is usually impractical for operators to reenter a day's work.

Online applications therefore require a system with special mechanisms for recovery and restart that batch systems do not require. These mechanisms ensure that each data set (resource) associated with an interrupted online application returns to a known state so that processing can restart safely.

An online system requires mechanisms that, together with suitable operating procedures, provide automatic recovery from failures and allow the system to restart with the minimum of disruption.

The two main recovery requirements of an online system are to maintain the integrity of data and to minimize the effect of failures.

Maintaining the integrity of the data means that the data is in the form you expect and has not been corrupted. The object of recovery operations on data sets, databases, and similar data resources is to maintain, and restore, the integrity of the information. Ideally, it should be possible to restore the data to a consistent, known, state following any type of failure, with a minimum loss of previous valid updating activity.

One way of doing this is to keep a record, or log, of all the changes made to a resource while the system is executing normally. If a failure occurs, the logged information can help recover the data.

The information can be used in two ways:

1. It can be used to back out incomplete or invalid changes to one or more resources. This is called backward recovery, or backout. For backout, it is necessary to record the contents of a data element before it is changed. These records are called before images. In general, backout is applicable to processing failures that prevent one or more transactions (or a batch program) from completing.

2. It can be used to reconstruct changes to a resource, starting with a backup copy of the resource taken earlier. This is called forward recovery. For forward recovery, it is necessary to record the contents of a data element after it is changed. These records are called after images. In general, forward recovery is applicable to data set failures, or failures in similar data resources, that cause data to become unusable because it has been corrupted or because the physical storage medium has been damaged.

In many cases, a data set failure also causes a processing failure. Then, forward recovery must be followed by backward recovery.

In some environments, a data set might need to remain online and open for update for extended periods. Normally, a backup copy of the data set cannot be taken while the data set is open. Thus, if a failure occurs that requires forward recovery, all updates that have been made to the data set since it was opened must be recovered. This means that all forward recovery logs that have been produced since the data set was opened must be kept. For a heavily-used data set that has been open for update for several days or weeks, much forward recovery could be needed.

Because of the above considerations, it was desirable to extend the methods for taking backups so as to allow a backup to be taken whilst a data set is open. This operation is known as backup while open (BWO). Any method which is used for taking a backup whilst the data set is open must be able to deal with the additional complications described in the following paragraphs.

European Patent application EP 0516900 discloses a method that does deal with these complications, where there is only a single updater. Such a method is implemented by a combination of the CICS, VSAM, CICS VSAM Recovery MVS/ESA and DSS products from IBM Corporation (IBM is a registered trademark and CICS is a trademark of IBM Corp). The method disclosed calculates a recovery time by referring to a block of storage associated with each Unit of Work that stores the time of the first log entry associated with that Unit of work. All of the blocks of storage are addressable by the single updater.

Data sets are updated by taking a copy of a part, such as a record, or all of the data set into a buffer in main memory. The copy in the buffer is then updated by the updater. When the updating is complete, the contents of the buffer are then copied back to replace the original data in the data set.

If a data set is being updated whilst a backup copy is being made, the backup copy thus obtained will require further processing before it can be used to recreate the original data set because:

Data residing in buffers at the start of the copy operation may not be reflected in the copied version of the data set; and Updates made during the copy operation may not be reflected in the copied version of the data set.

These deficiencies may be remedied at restore time by using a forward recovery process. (Provided, of course, that the system performing the updates writes a forward recovery log.)

If a time can be established which precedes the time of creation of the oldest data held in buffers at the start of the copy operation, the missing data may be recreated by forward recovering from this time. This time will be referred to as the 'Basic Recovery Time'.

An algorithm that allows a Basic Recovery Time to be calculated for use with a data set copy made whilst a single system is still updating the data set has been used for some time in a number of products from IBM Corporation, such as CICS, DSS, VSAM and CICS/VR. In a shared environment, resources may be updated by a number of systems concurrently. This algorithm only functions whilst the data set is open for update by a single updater because if there are multiple updaters then the Recovery Time that needs to be recorded is different for each of the updaters sharing the data set.

So it would be desirable to provide a method of taking backup copies of data sets when these data sets are open for update and are being updated by many systems in a shared environment. It would also be desirable to provide a method of recovering the original data sets from these back up copies and the forward recovery log or logs created by the updating systems.

The individual log records may contain tokens which can be mapped to the name of the data set which is being recovered. Tokens are used instead of the name of the data set in order to reduce the amount of data which has to be logged. The tokens are mapped to data set names by using additional log records called tie up records (TURs). For non-BWO backups, the forward recovery utility uses these TURs to apply the log records to the correct data sets.

The forward recovery process needs to access a set of all the relevant tie-up records. These will have been written before the Basic Recovery Time mentioned above. The most-recent time at which a full set of tie-up records have been written on the log is referred to as the 'Recovery Time'.

It would be desirable to be able to easily determine this 'Recovery Time' in a system with data sets open for shared update. This 'Recovery Time' is then communicated to the forward recovery process.

DISCLOSURE OF THE INVENTION

Accordingly the invention provides a method, for use in a backup manager, of taking a backup copy of a data set for use, together with a log, in forward recovery of said data set, the updaters updating a part of the data set by copying said part into a buffer, performing an update on the copy in said buffer, and copying the updated buffer contents to said part of the data set, the method comprising the steps, by the backup manager, of: taking a backup copy of said data set; characterised in that: the data set is open for update by multiple updaters; and the method further comprises the steps, prior to said taking a backup copy, of: indicating the current time as a Recovery Time; waiting until all updaters have copied all said updated buffer contents to said part of the data set.

In a preferred embodiment, records written in the log include tokens, each token corresponding to one of a plurality of data sets, the correspondence being achieved by means of tie-up records written in the log, and the method further comprising the step, prior to taking a backup copy, of requesting all updaters to write tie-up records to the log for all tokens in use that relate to the data set being copied.

The invention also provides a data processing apparatus comprising: means for storing a data set; means for maintaining a log for use in forward recovery of said data set; means for updating a part of said data set by copying said part of the data set into a buffer, performing an update on the copy in said buffer, and copying the updated buffer contents to said part of the data set; a backup manager for taking a backup copy of said data set; characterised in that: the data set is open for update by multiple means for updating; the apparatus comprises a plurality of said means for updating; and the backup manager further comprises means for indicating the current time as a Recovery Time; means for waiting until all the updating means have copies all said updated buffer contents to said part of the data set; and means for initiating a backup copy on completion of copying by the updating means.

BRIEF DESCRIPTION OF THE DRAWINGS

An embodiment of the invention will now be described, by way of example, with reference to the accompanying drawings, in which:

FIG. 4 is a flow diagram of the steps of taking a data set copy according to the present invention.

DETAILED DESCRIPTION OF THE INVENTION

Figure 1:
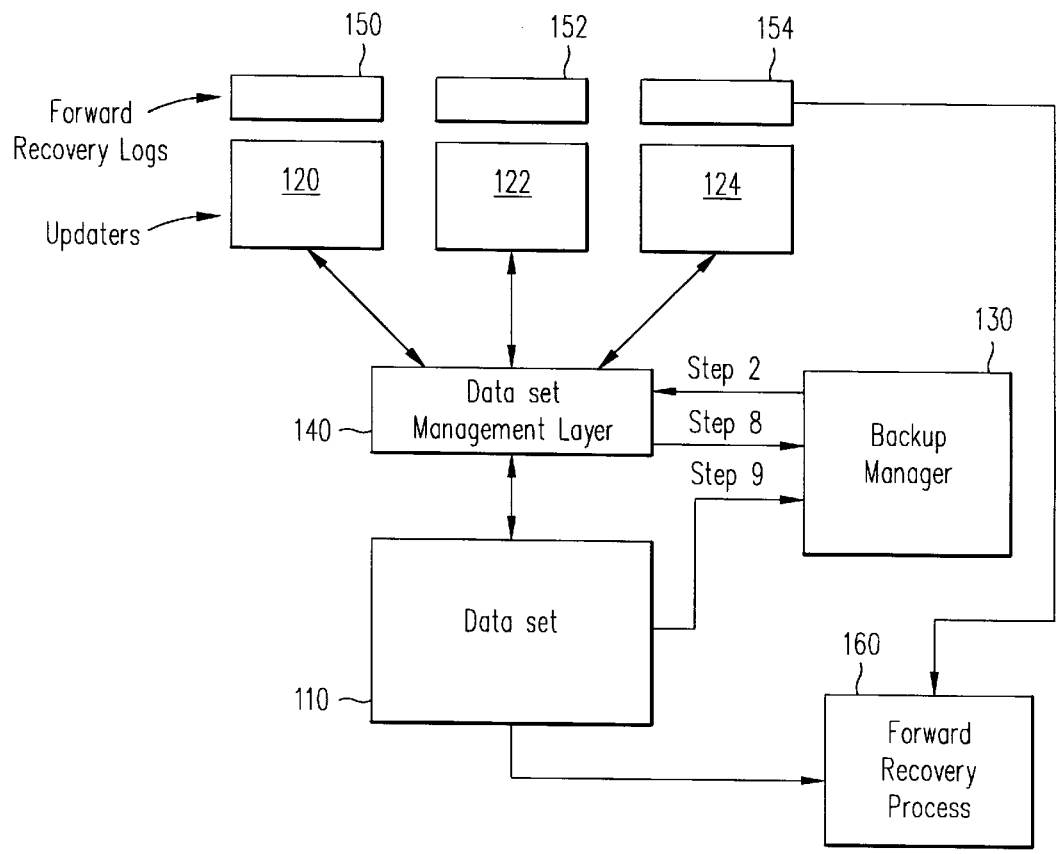
FIG. 1 is a block diagram of the components required for the present invention.

FIG. 1 shows the components used in an embodiment of the invention. A data set is shown at 110 and contains information stored in a way which will be familiar to those skilled in the art and will not be described further. The data set 110 is open for update by more than one updater 120, 122, 124. In an embodiment of the invention the updaters 120, 122, 124 are each systems running a CICS transaction processor from IBM Corporation.

The updaters are running transactions which process data which they receive from one or more sources and result in updates to the data set 110. A 'transaction' is a sequence of actions, all of which need to be complete before any of the individual actions can be regarded as complete. This may be a number of separate updates to the data set 110, which either all need to be completed, or none of them must be completed. Once all of the separate changes are made, the transaction can be committed. Committed changes do not have to be backed out if the transaction or the system fails. Changes which have not been committed have to be backed out if the transaction or the system fails.

A backup manager is shown at 130. In a preferred embodiment this backup manager 130 is the DSS product from IBM Corporation. The function of the backup manager 130 is shown in the flow diagram of FIG. 2.

Figure 2:
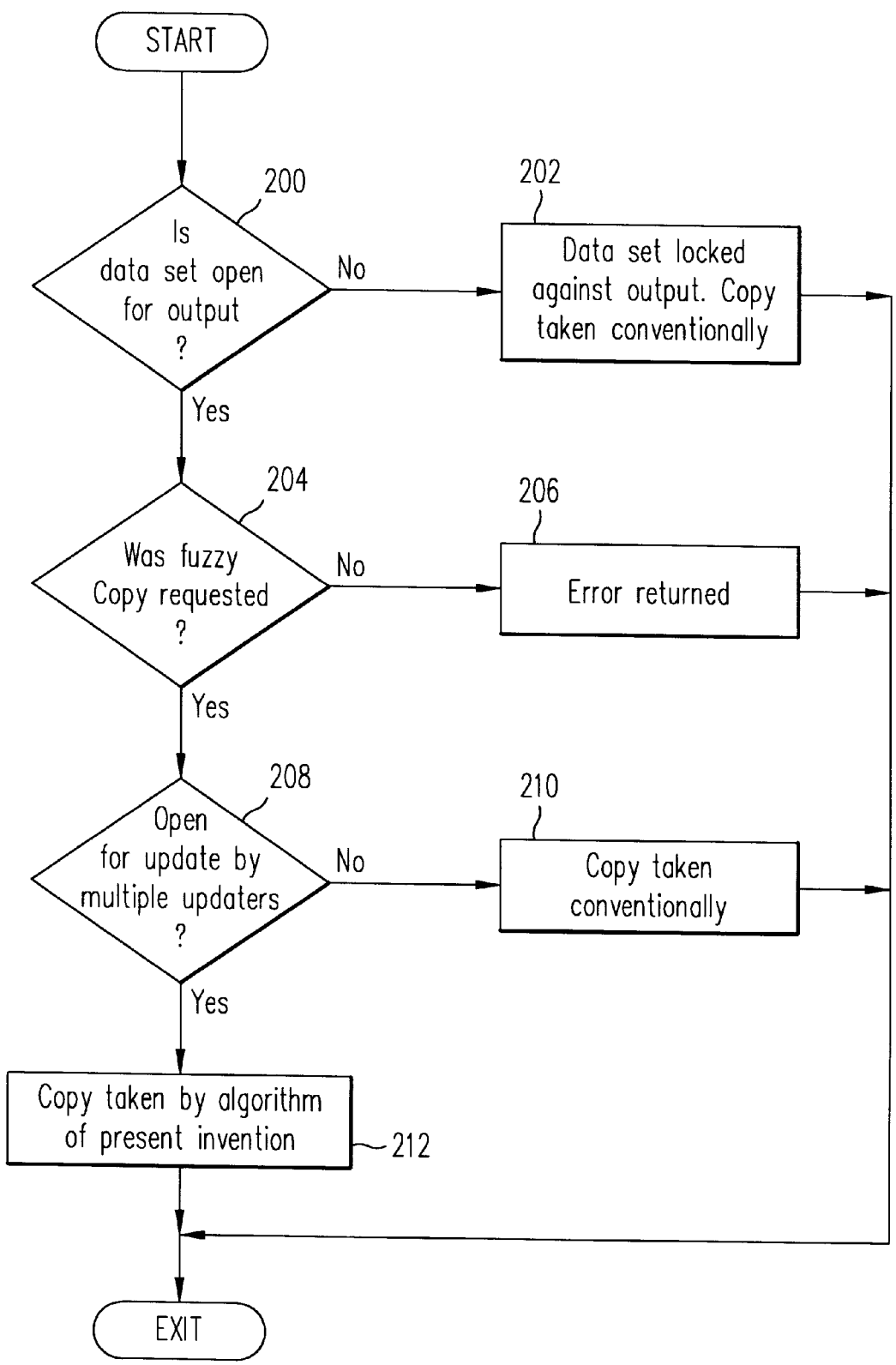
FIG. 2 is a flow diagram showing the operation of a backup manager.

Referring to FIG. 2, at step 200, the coordinator checks whether the data set to be copied is open for output. If it is not, then at step 202 the data set is locked against being opened for output and a copy is taken conventionally, without the need to apply changes taken from the forward recovery log. The present invention is not used for this copying process. The copying process exits.

At step 204, the coordinator checks whether a fuzzy copy was requested. In a fuzzy copy, techniques for taking a backup while open must be used. If a fuzzy copy was not requested, then at step 206 an error is returned to the requester of the copy and the copying process exits.

If a fuzzy copy was requested, then at step 208, the coordinator checks whether the data set which it was requested to copy is open for update in a shared mode which mode potentially allows multiple updaters. If it is open for update in a non-shared mode, then the prior art algorithm described above may be used at step 210 to copy the data set. The copying process exits. If it is open for update in a shared mode, which mode potentially allows multiple updaters, then at step 212, the algorithm of the present invention is used to copy the data set.

A data set management program is shown at 140. This program propagates requests from the backup manager 130 to the updaters and from the updaters to the backup manager 130. In a preferred embodiment this data set management program 140 is the VSAM product from IBM Corporation.

Also shown in FIG. 1 is a forward recovery utility 150. This does not participate in the copying of the data set, but is used to recover the data set from the log records written and the backup copies taken, including a backup copy taken using the present invention.

Figure 3:
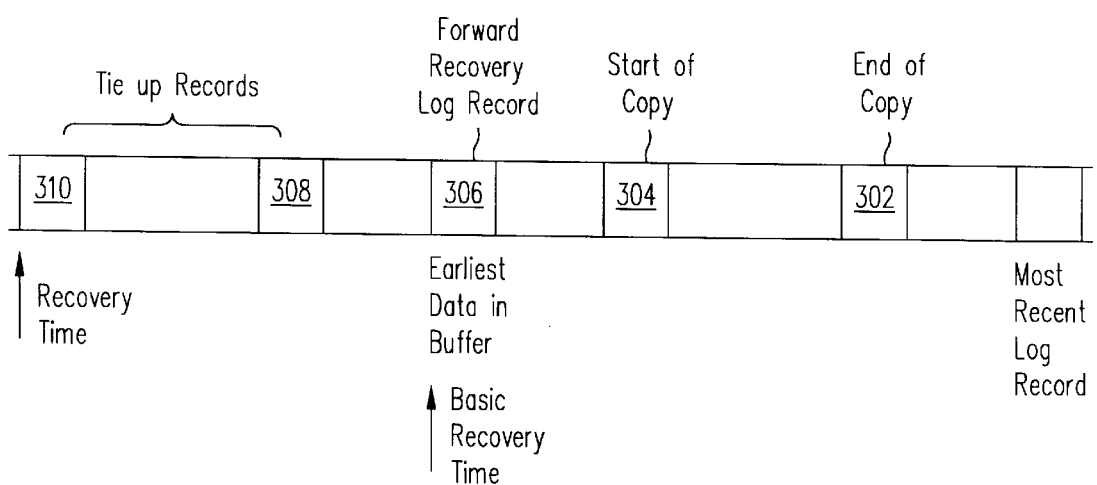
FIG. 3 is a diagram of a prior art log showing calculation of recovery time for a system having a single updater.

FIG. 3 shows a prior art log showing calculation of recovery time for a system having a single updater. Log records relevant to the copying process are shown, with the ones written earliest being depicted on the left of the figure, and the most recently written ones being depicted on the right. Record 302 is a record corresponding to the end of the copy operation. Record 304 is a record corresponding to the start of the copy operation. As described above, if a time can be established which precedes the time of creation of the oldest data held in buffers at the start of the copy operation, the missing data may be recreated by forward recovering from this time. Record 306 is a record corresponding to the time of creation of the oldest data held in buffers (Basic Recovery Time). Records 308 and 310 show tie up records written by the updater. These records may have been written at any time since the updater started to update the data set and the log must be searched for these records. If there are multiple updaters, then all of the necessary tie-up records for all of the multiple updaters must be found.

The operation of the present invention will now be described with reference to FIG. 4 which shows the steps of taking a data set copy.

| Backup manager 130 (DSS) | Data set management layer 140 (VSAM) | Data set updaters 120, 122, 124 (CICS systems) |
|---|---|---|
| 1. Record the current time (NOW) 2. Notify that a backup is about to be taken | | |
| | 3. Notify that a backup is about to be taken | |
| | | 4. Write a set of tie-up records to forward recovery log 150, 152, 154 respectively 5. Harden any data in buffers to disk 6. Notify that ready for copy to proceed |
| | 7. Wait until all updaters 120, 122, 124 have notified that copy ready to proceed 8. Notify copying coordinator 130 that copy may proceed | |
| 9. Control record added to backup copy identifying the Recovery Time 10. Data set 110 copied | | |

Step 1.

The copying coordinator records the current time (NOW). This time will become the Recovery Time.

Step 2.

The copying coordinator notifies the data set management layer that a backup is about to be taken.

Step 3.

The data set management layer notifies each system that has the data set open for update that a copy is about to take place.

Step 4.

Each updater writes a set of tie up records to its forward recovery log.

The tie up records and individual Forward Recovery log records must identify the updater. Different updaters may have a different file name to data set name mapping. For example, the Forward Recovery utility may need to process records for FILE A from updater A, but ignore records from FILE A from updater B. The updater may write the tie up records to a single log maintained by that updater for all copying operations involving that updater. Each of the multiple updaters has their own log. These are merged together when forward recovery takes place. In another embodiment, the updater may write the tie up records to a single log for that data set, to which all of the updaters write. In a further embodiment, an association may exist between a data set and a log, the association defining which data sets have forward recovery data stored on which logs.

If the updater does not use tokens to record, on the log, the name of the data set, but instead records the data set name on the log, then the writing of tie up records is unnecessary. Other steps in the invention are unchanged.

Step 5.

After writing its set of tie up records, each updater hardens any data in buffers to disk. In the preferred embodiment of a CICS transaction processor, this is done by letting all transactions reach a commit point. However, all that is required is that all buffered data should be hardened to disk. This can be by specifically instructing updaters to write data to buffers to disk.

Step 6.

Each updater then notifies the data set management layer that it is ready for a copy to proceed.

Step 7.

The data set management layer then waits until EVERY updater as told it that it is ready for a copy to proceed.

Step 8.

At this point, the data set management layer notifies the copying coordinator that the copy may proceed.

Step 9.

The copying coordinator creates an additional control record identifying the Recovery Time. In the preferred embodiment, this is placed at the start of the copy of the data set. It could however be placed in another record in the data set copy. The Recovery Time is the time NOW as described above.

Step 10.

The copying coordinator copies the data set.

The steps involved in restoring the data set from the copy will now be described. These steps are common to those used in prior art forward recovery utilities, but because of the additional steps and the record identifying the Recovery Time which was written, the forward recovery utility is able to recover a data set which was backed up while open for update by multiple updaters. The Recovery Time which was written, because of the steps in Table 1, represents a Recovery Time that is valid for all of the updaters. Without the additional steps, the data set could not have been open for update by multiple updaters, only by a single updater.

Step 1.

A copy of data set is restored from disk by the backup manager 130.

Step 2.

The Recovery Time (stored at step 10 of the copying process) is copied by the backup manager 130 from the record holding the Recovery Time to a position where the forward recovery utility can access it. This may be, for example, in a catalog entry for the data set that is stored by the data set management program.

Step 3.
- Either a) If there are separate forward recovery logs for each updater, then the forward recovery logs are merged;
- Or b) If the log information from each updater was already merged into a single log for that data set, then that log is already a merged log;
- Or c) If there are separate forward recovery logs for each updater, then an offline process was run before the forward recovery process started.

Step 4.
Conventional Forward Recovery using a Forward Recovery Utility 150 is then run, such as described with relation to the prior art, and described in more detail in CICS/ESA v4.1 Recovery and Restart Guide SC33-1182-00, published by IBM Corp. This process includes the steps described below as steps 5 to 8.

Step 5.
The Forward Recovery Utility 150 obtains the Recovery Time from the location where it was placed at step 2.

Step 6.
The Forward Recovery Utility 150 positions the forward recovery log at the Recovery Time and begins reading records from this point.

Step 7.
The Forward Recovery Utility 150 obtains the tie up records for each updater.

Step 8.
Once it has found a tie up record, it applies all forward recovery log records that follow this time.

Note: The Forward Recovery Utility must be able to cope with the fact that some of the updates that it sees on the forward recovery log may already have been applied at the time that the copy was taken.

Note: The Forward Recovery Utility must be able to cope with the fact that different updaters may use the same token to refer to different data sets.

What is claimed is:

1. A method, for use in a backup manager, of taking a backup copy of a data set for use, together with a log, in forward recovery of said data set, updaters updating a part of the data set by copying said part of the data set into buffers, performing an update on the copy in said buffers, and copying the updated buffers contents to said part of the data set, the method comprising the steps, by the backup manager, of:
    taking a backup copy of said data set;
    characterized in that:
        the data set is open for update by multiple updaters; and
        the method further comprises the steps, prior to said taking a backup copy, of:
            indicating the current time as a Recovery Time; and
            waiting until all updaters have copied all said updated buffers contents to said part of the data set.

2. A method as claimed in claim 1, wherein before said waiting step, all updaters are requested to copy all data in said buffers to said part of the data set.

3. A method as claimed in claim 2, wherein records written in the log include tokens, each token corresponding to one of a plurality of data sets, the correspondence being achieved by means of tie-up records written in the log, the method further comprising the step, prior to taking a backup copy, of requesting all updaters to write tie-up records to the log for all tokens in use that relate to the dat set being copied.

4. A method as claimed in claim 2, wherein:
    before said requesting step, said backup manager notifies a data set manager that a backup is to be taken;
    said data set manager requests all updaters to copy all data in said buffers; and
    said data set manager notifies said backup manager that all updaters have copied all data in said buffers.

5. Data processing apparatus comprising:
    means for storing a data set;
    means for maintaining a log for use in forward recovery of said data set;
    means for updating a part of said data set by copying said part of the data set into buffers, performing an update on the copy in said buffers, and copying the updated buffers contents to said part of the data set;
    a backup manager for taking a backup copy of said data set;
    characterised in that:
        the data set is open for update by multiple means for updating;
        the apparatus comprises a plurality of said means for updating; and
        the backup manager further comprises means for indicating a current time prior to starting to take a backup copy as a Recovery Time;
        means for waiting until all the updating means have copied all said updated buffers contents to said part of the data set; and
        means for initiating a backup copy on completion of copying by the updating means.

6. In a computer system having an online backup manager, a method for backing up a data set stored on a storage device, a plurality of updaters making updates to the data set, the method performed by the backup manager comprising the steps of:
    (a) designating a recovery time;
    (b) maintaining at least one log comprising a plurality of records corresponding to the updates for the data set;
    (c) waiting until all updates by the plurality of updaters from prior to the recovery time have been written to the data set stored on the storage device; and
    (d) after completing steps (a) through (c), making a backup copy of the data set, wherein the backup copy and the at least one log are used in a forward recovery of the data set.

7. The method as claimed in claim 6 further comprising the step of:
    (e) prior to step (c), sending a request to all of the plurality of updaters to write all updates to the data set stored on the storage device.

8. The method as claimed in claim 7, wherein the updates are for a plurality of data sets, each of the log records including a token corresponding to one of the plurality of data sets, wherein a tie-up record provides the correspondence between the token and the one of the plurality of data sets.

9. The method as claimed in claim 8 further comprising the step of:
    (f) prior to step (c), sending a request to all updaters to write tie-up records to the log for all the tokens in use that correspond to the data set being copied.

10. The method as claimed in claim 6 further comprising the step of:
    (g) prior to step (c), the backup manager sending a notification to a data set manager that the backup of the data set is to be made;

(h) the data set manager sending a request to all updaters to write all updates to the data set stored on the storage device; and (i) the data set manager sending a notification to the backup manager that all updaters have written all updates prior to the recovery time to the data set on the storage device.

11. The method as claimed in claim 6 wherein all the updates from each updater are maintained in a separate log for each updater.

12. The method as claimed in claim 6 wherein a single log is maintained for all the updates from all the updaters.

13. The method as claimed in claim 6 wherein all updates for a group of updaters are maintained in a separate log for each group of updaters.

14. The method as claimed in claim 6 wherein the data set remains available to the updaters during step (a) through step (d).

15. An online backup system for a computer system having a data set stored on a storage device, and a plurality of updaters making updates to the data set, the online backup system comprising:

at least one log comprising a plurality of records corresponding to the updates to the data set; and a backup manager for making a backup copy of the data set after designating a recovery time, and waiting until all updates by the plurality of updaters prior to the recovery time have been written to the data set stored on the storage device, wherein the backup copy and the at least one log are used in a forward recovery of the data set.

16. The system as claimed in claim 15 wherein the backup manager sends a request to all of the plurality of updaters to write all updates to the data set stored on the storage device.

17. The system as claimed in claim 16 wherein the updates are for a plurality of data sets, each of the log records including a token corresponding to one of a plurality of data sets, wherein a tie-up record provides the correspondence between the token and the one of the plurality of data sets.

18. The system as claimed in claim 17 wherein the backup manager sends a request to all updaters to write tie-up records to the log for all the tokens in use that correspond to the data set being copied.

19. The system as claimed in claim 15 further comprising;

a data set manager, in response to a notification from the backup manager, sending a request to all updaters to write all updates to the data set stored on the storage device, the data set manager sending a notification to the backup manager when all updaters have written all updates from prior to the recovery time to the data set on the storage device.

20. The system as claimed in claim 15 wherein all the updates from each updater are maintained in a separate log for each updater.

21. The system as claimed in claim 15 wherein a single log is maintained for all the updates from all the updaters.

22. The system as claimed in claim 15 wherein all updates for a group of updaters are maintained in a separate log.

23. The system as claimed in claim 15 wherein the data set remains available to the updaters during the making of the backup copy of the data set.

* * * * *